United States Patent [19]

Kaufman et al.

[11] Patent Number: 4,971,220
[45] Date of Patent: Nov. 20, 1990

[54] CONTAINER WITH "STAY OPEN" LID

[75] Inventors: David P. Kaufman, Appleton; Lynn A. Mellenthin, Cottage Grove, both of Wis.

[73] Assignee: Kimberly-Clark Corporation, Neenah, Wis.

[21] Appl. No.: 449,643

[22] Filed: Dec. 11, 1989

[51] Int. Cl.⁵ .............................................. B65D 43/24
[52] U.S. Cl. .................................... 220/335; 220/306; 220/337; 220/339
[58] Field of Search ............... 220/335, 337, 339, 306, 220/355, 356, 264, 281, 307

[56] References Cited

U.S. PATENT DOCUMENTS

| | | | |
|---|---|---|---|
| 4,013,214 | 3/1977 | Hansen et al. | 229/44 R |
| 4,170,315 | 10/1979 | Dubach et al. | 220/281 |
| 4,303,176 | 12/1981 | Swartzbaugh | 220/306 |
| 4,452,373 | 6/1984 | Pearce et al. | 220/335 |
| 4,471,881 | 9/1984 | Foster | 220/339 |
| 4,635,797 | 1/1987 | Bankier | 206/472 |
| 4,648,511 | 3/1987 | Ritman | 206/541 |
| 4,892,247 | 1/1990 | Dirksing et al. | 229/125.26 |

Primary Examiner—Stephen Marcus
Assistant Examiner—Vanessa M. Roberts
Attorney, Agent, or Firm—Gregory E. Croft

[57] ABSTRACT

A wet wipe container contains first and second protruding surfaces within the lid and base, respectively, which contact each other to maintain the lid in a partially open position until the user applies a sufficient downward force to close the lid. Maintaining the lid in a partially open position is particularly advantageous for users of baby wipes, who frequently have to reach into the container for a second wipe using only one hand.

9 Claims, 2 Drawing Sheets

CONTAINER WITH "STAY OPEN" LID

BACKGROUND OF THE INVENTION

Hinged containers used to package and dispense baby wet wipes have lids that tend to fall completely or nearly closed by themselves. Because users of baby wipes frequently require more than one wipe, it is necessary to essentially reopen the container to remove successive wipes. This is an inconvenience when changing diapers. A further disadvantage of such containers is that it is sometimes not readily apparent that the lid has not completely closed, which may cause the user to leave the container open for extended periods of time, during which much of the liquid in the wet wipes can evaporate.

SUMMARY OF THE INVENTION

It has now been discovered that a container can be designed to provide a lid which remains in a clearly partially open position until the user forces the lid down to close the container. This is especially advantageous for containers designed to dispense wipes, particularly wet wipes. Hence, in one aspect, the invention resides in a container comprising a lid and a base connected together at a common juncture by a hinge; the container having a first protruding surface adjacent to the hinge which protrudes from the lid toward the base when the container is closed; the container having a second protruding surface adjacent to the hinge which protrudes from the base toward the lid when the container is closed and which contacts the first protruding surface during closure of the container; said first and second protruding surfaces, while in contact, maintaining the lid in a partially-open position until external force is applied to the lid to close the container; said hinge and protruding surfaces being sufficiently deformable to permit the protruding surfaces, when in contact, to slide past each other only when external force is applied to the lid during closure of the container.

Preferably, the contacting protruding surfaces maintain the lid in a partially open position wherein the angle of the lid relative to the base is from 5° to 70°, preferably from about 10° to about 50°, and most preferably from about 15° to about 40°.

The design and location of the hinge of the container can vary in many respects for cost and manufacturing reasons, provided the container functions as described above. For example, the lid and base can be molded as one piece, being joined together by a thin area of flexible material (the hinge) which allows the lid to be folded over to form the container. Alternatively, the lid and base can be completely separate pieces which interlock and pivotally connect to each other at the hinge. In a preferred embodiment, the container is formed by sonic welding together overlapping flaps of the lid and base.

The design of the protruding surfaces can also vary depending upon the overall design of the container. In general, it is preferred that the protruding surfaces be positioned adjacent or close to the hinge in order to minimize the extent to which the protruding surfaces must protrude to achieve a given degree of lid opening without interfering with access to the contents of the container. As the distance between the protruding surfaces and the hinge increases, the protruding surfaces must protrude further to maintain a given lid opening. The shape of the protruding surfaces is largely a matter of choice, provided the protruding surfaces interact to maintain the lid in a partially open position in the absence of external force on the lid. The weight of the lid alone cannot close the lid beyond a 5° opening. It is preferred that the protruding surfaces be in the shape of a ridge aligned parallel to the hinge as will be more fully described with reference to the Drawing. However, the protruding surfaces can be discontinuous or single or multiple protrusions such as a ridge with notches, a plurality of knobs or bumps or the like, or even a single knob or bump or the like.

Regardless of the shape of the protruding surfaces, they must naturally contact each other during closure of the container to impede closure. At the same time, the container (either the protruding surfaces or the hinge or the adjacent portions of the container) must be capable of elastic deformation sufficient to allow the contacting protruding surfaces to slide past each other during closure of the container, but only when external force is applied to the lid. In this way the container will remain partially open until the user wants it closed.

DETAILED DESCRIPTION OF THE INVENTION

Figure 1:
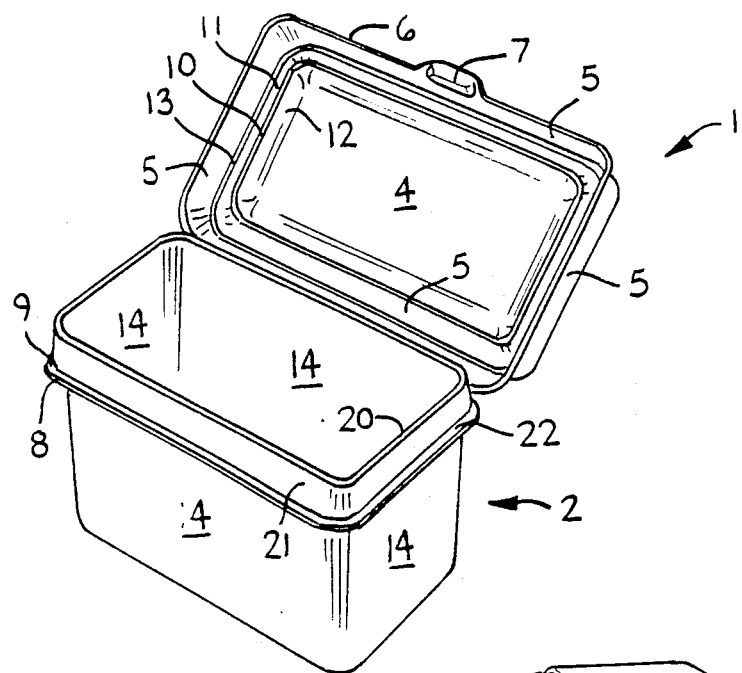
FIG. 1 is a perspective view of a preferred container in accordance with this invention in which the lid is in a substantially wide open position to show the inside of the lid.

Referring now to the drawing, the invention will be described in greater detail. FIG. 1 illustrates a container in accordance with this invention having a lid 1 and a base 2 connected together by a hinge (not visible in this figure). The lid comprises a planar top surface 4, four top sidewalls 5, a lid edge 6 which extends around the periphery of the lid and terminates at the hinge, and a latching device 7 designed to grip the edge 8 of the lip 9 of the base. Also included within the lid is a protruding surface (first protruding surface), the peak of which is indicated by reference numeral 10. In this embodiment the protruding surface is a continuous ridge running parallel to the edge of the lid. The ridge protrudes downwardly from the lid toward the base when the container is closed and is formed by surfaces 11 and 12. The juncture of surfaces 5 and 11 forms a valley denoted by reference numeral 13.

The base of the container provides space for a stack of wet wipes or similar article and comprises a planar bottom surface (not visible in this figure) and four bottom sidewalls 14. The bottom sidewalls terminate at their uppermost extremity at the peak of a second protruding surface 20 which, in this embodiment, is a continuous ridge extending near the upper periphery of the base. The ridge is also formed in part by a downwardly sloping sidewall 21 which terminates at a lip 22. The lip extends around the periphery of the base.

Figure 2:
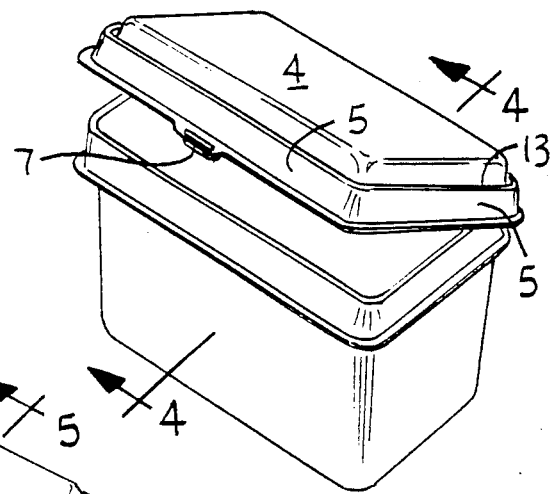
FIG. 2 is a perspective view of the container of FIG. 1 in a partially open position.

FIG. 2 illustrates the same container illustrated in FIG. 1, but showing the lid in partially open position.

This is the position the lid naturally assumes after first being opened by the user as shown in FIG. 1. Shown in this figure is the top surface 4, the juncture of surfaces 5 and 11 referred to above as the valley 13 in FIG. 1, the latching device 7, and the top sidewalls 5. The view of the base of the container is substantially the same as shown in FIG. 1.

Figure 3:
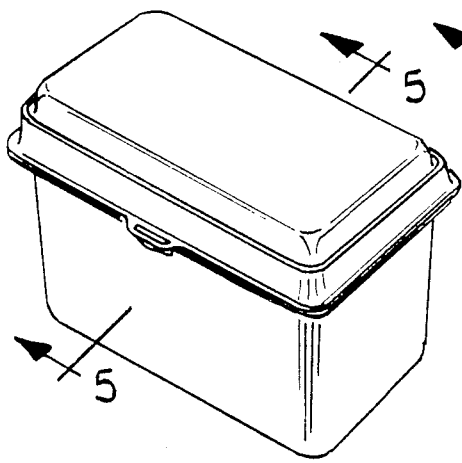
FIG. 3 is a perspective view of the container of FIG. 1 in a closed position.

FIG. 3 illustrates the same container illustrated in FIGS. 1 and 2, but in a closed position. In this position, the container effectively minimizes vapor losses of the wet wipe solution because of the cooperative design of the lid and base. In this closed position, the latching device grips the lip of the base and provides a positive closure. The container can be easily opened by the user simply by placing a finger or thumb under the latching device and lifting the lid upward. The inherent flexibility of the top sidewall and the latching device allow the latching device to release the lip of the base to open the container.

Figure 4:
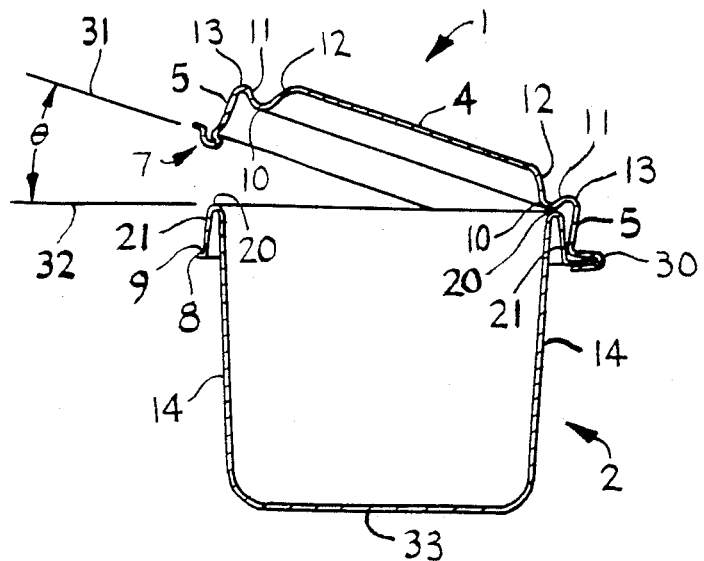
FIG. 4 is a cross-sectional side view of the container of FIG. 2.

FIG. 4 is a cross-sectional view of the container as shown in FIG. 2, illustrating the interaction between the first and second protruding surfaces to maintain the container in a partially open position. Portions of the container previously discussed in connection with the foregoing FIGS. 1–3 are provided with reference numerals for clarity. Shown in this FIG. 4 is the container hinge 30, in which overlapping portions of the lid and base, which have been separately formed, have been sonically-welded together. This container is sufficiently flexible to enable the first protruding surface to slide past the second protruding surface during closure of the container. As shown in this figure, first and second protruding surfaces are positioned adjacent the hinge of the container. When the first and second protruding surfaces are in contact with each other as shown, the lid is maintained in a partially open position in the absence of external force applied by the user to close the lid. The degree of openness is indicated by the angle 0, which is formed by the intersection of the plane of the lid opening with the plane of the base opening. As previously mentioned, this angle is preferably from about 15° to about 40°. Also shown in this figure is the bottom 33 of the base of the container.

Figure 5:
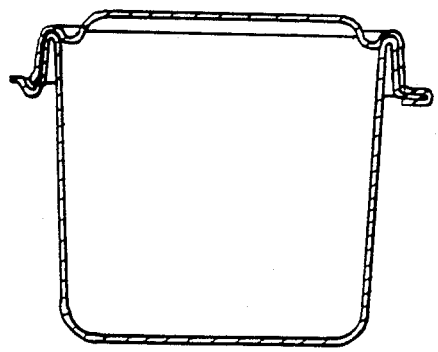
FIG. 5 is a cross-sectional side view of the container of FIG. 3.

FIG. 5 is a cross-sectional view of the container of FIG. 3, illustrating the relationship of the first and second protruding surfaces when the container is in a closed position. It should be pointed out that, for purposes of this invention, frictional or contacting engagement of the first and second protruding surfaces need only occur adjacent the hinge, notwithstanding the fact that the first and second protruding surfaces may extend to other portions of the lid and base as shown above.

While this invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations which fall within the spirit and broad scope of the appended claims.

We claim:

1. A container comprising a lid and a base connected together at a common juncture by a hinge, the lid having a first protruding surface adjacent the hinge which protrudes toward the base when the container is closed, the base having a second protruding surface which protrudes toward the lid when the container is closed and which contacts the first protruding surface during closure of the container, said first and second protruding surfaces, while in contact, maintaining the lid in a partially open position until external force is applied to the lid to close the container, said container being sufficiently deformable to permit the protruding surfaces, when in contact, to slide past each other only when external force is applied to the lid during closure of the container.

2. The container of claim 1 wherein the angle of the lid relative to the base in the partially open position is from 5° to 70°.

3. The container of claim 1 wherein the angle of the lid relative to the base in the partially open position is from about 10° to about 50°.

4. The container of claim 1 wherein the angle of the lid relative to the base in the partially open position is from about 15° to about 40°.

5. The container of claim 1 wherein the first and second protruding surfaces are elastically deformable.

6. The container of claim 1 wherein the first and second protruding surfaces are ridges.

7. The container of claim 1 wherein the first and second protruding surfaces are ridges aligned parallel to the hinged juncture of the lid and base.

8. The container of claim 1 wherein the hinge is continuous along the common juncture of the lid and the base.

9. A container comprising a lid and a base connected together at a common juncture by a continuous hinge, the lid having a first protruding ridge aligned parallel to the hinge and adjacent thereto and which protrudes toward the base when the container is closed, the base having a second protruding ridge aligned parallel to the hinge and adjacent thereto and which protrudes toward the lid when the container is closed and which contacts the first protruding ridge during closure of the container, wherein said first and second protruding ridges, while in contact, maintain the lid in a partially open position at an angle of from about 15° to about 40° relative to the base until external force is applied to the lid to close the container, said container being sufficiently deformable to permit the protruding ridges, when in contact, to slide past each other only when external force is applied to the lid during closure of the container.

* * * * *